United States Patent [19]

Stefansky

[11] Patent Number: 5,694,271
[45] Date of Patent: Dec. 2, 1997

[54] SPACE EFFICIENT MAGNETIC TOGGLE LATCH ASSEMBLY FOR A DISC DRIVE ACTUATOR

[75] Inventor: F. Mark Stefansky, Longmont, Colo.

[73] Assignee: Seagate Technology, Inc., Scotts Valley, Calif.

[21] Appl. No.: 634,345

[22] Filed: Apr. 18, 1996

[51] Int. Cl.$^6$ ........................................... G11B 5/54
[52] U.S. Cl. .................................................. 360/105
[58] Field of Search ................................. 360/105, 106, 360/86

[56] References Cited

U.S. PATENT DOCUMENTS

| 4,679,102 | 7/1987 | Wevers et al. |
| 4,868,695 | 9/1989 | Quatro et al. ................ 360/105 |
| 5,187,627 | 2/1993 | Hickox et al. |
| 5,208,713 | 5/1993 | Lindsay et al. |
| 5,224,000 | 6/1993 | Casey et al. |
| 5,231,556 | 7/1993 | Blanks |
| 5,495,376 | 2/1996 | Wasson et al. ............... 360/104 |
| 5,528,437 | 6/1996 | Mastache ...................... 360/105 |

Primary Examiner—Craig A. Renner
Attorney, Agent, or Firm—Bill D. McCarthy; Edward P. Heller, III; Randall K. McCarthy

[57] ABSTRACT

A latch assembly used for latching an actuator in a disc drive. The latch assembly comprises a coil assembly for selectively generating magnetic fields of alternating polarity in a pair of magnetically permeable plates. The plates are separated by a vertical gap which includes a coil, so that the passage of electrical current through the coil establishes magnetic polarities within the plates. Adjacent the coil assembly is a rocker assembly which is pivotable about a horizontal axis and comprises a latch arm and a coil arm, both of which extend in opposite directions from a central hinge portion. The distal end of the coil arm includes a permanent magnet which alternately detents between positions proximate to the plates of the coil assembly. The latch assembly latches the actuator by energizing the coil, which establishes a magnetic field in the plates that interacts with the magnetic field of the permanent magnet to move the coil arm proximate one of the plates, causing the rocker assembly to pivot so that the distal end of the latch arm latches the actuator. To unlatch the actuator, a current is applied to the coil to establish a magnetic field of opposite polarity, so that the coil arm moves to a position proximate the other one of the plates, causing the rocker assembly to pivot so that the latch arm moves out of the way of the actuator, allowing free movement of the actuator. The gap between the coil arm and the coil assembly when the actuator is latched is less than the gap between the coil arm and the coil assembly when the actuator is unlatched. The attraction between the permanent magnet and the plates is sufficient without application of the magnetic fields to maintain the orientation of the rocker assembly.

8 Claims, 4 Drawing Sheets

SPACE EFFICIENT MAGNETIC TOGGLE LATCH ASSEMBLY FOR A DISC DRIVE ACTUATOR

BACKGROUND OF THE INVENTION

1. Field of the Invention

This invention relates generally to the field of disc drive data storage devices, and more particularly, but not by way of limitation, to a latch assembly for selectively locking a disc drive actuator in a fixed location.

2. Discussion

Disc drives are commonly used in workstations, personal computers, laptops and other computer systems to store large amounts of data in a form that can be made readily available to a user. In general, a disc drive comprises one or more magnetic discs that are rotated by a spindle motor at a constant high speed. The surface of each disc is divided into a series of data tracks which are spaced radially from one another across a band having an inner diameter and an outer diameter. The data tracks extend circumferentially around the discs and store data in the form of magnetic flux transitions within the radial extent of the tracks on the disc surfaces. Typically, each data track is divided into a number of data sectors that store fixed sized data blocks.

A head (transducer) senses the magnetic transitions on a selected data track to read the data stored on the track or to transmit an electrical signal that induces magnetic transitions on the track to write data to the track. The head includes a read/write gap that positions the active elements of the head at a location suitable for interaction with the magnetic transitions on the data tracks of a disc as the disc rotates.

Typically, a head is provided for each corresponding disc surface and is mounted to a rotary actuator so as to be selectively positionable by the actuator over a preselected data track to either read data from or write data to the preselected data track. The head structure includes a slider assembly having an air bearing surface that causes the head to fly over the data tracks of the disc surface due to fluid air currents caused by rotation of the disc.

When the disc drive is not in use, the heads are "parked" in a position so as to not interfere with the data storage surfaces of the discs. Typically, a "landing zone" is provided on each of the disc surfaces so that, once the discs are no longer actively rotated by the spindle motor (such as upon receipt of a "sleep" or "off" command), the actuator moves the heads over the landing zones before the rotational velocity of the spinning discs decreases to the point where the air bearing surface generated by the rotation of the discs is insufficient to support the heads. The landing zones are generally located towards the inner diameter of the disc surfaces where the heads come to rest once the rotation of the discs is sufficiently decreased.

Once the heads are positioned over the landing zones, it is necessary to secure the actuator by way of a latching arrangement to prevent the heads from subsequently moving out onto the data surfaces of the discs while the disc drive is not in use. Latching arrangements are well known in the art and have included various configurations of springs, solenoids and magnets to secure and release the actuator. For example, see U.S. Pat. No. 5,187,627 entitled MAGNETIC LATCH AND CRASH STOP, issued Feb. 16, 1993 to Hickox and Stram, U.S. Pat. No. 5,224,000 entitled CRASH STOP AND MAGNETIC LATCH FOR A VOICE COIL ACTUATOR, issued Jun. 29, 1993 to Casey and West, and U.S. Pat. No. 5,231,556 entitled SELF-HOLDING LATCH ASSEMBLY, issued Jul. 27, 1993 to Blanks. All of these references are assigned to the assignee of the present invention and incorporated herein by reference.

It is generally desirable to park the heads quickly, as the power to park the heads at the time of a power loss is typically provided from the back EMF of the spindle motor; that is, after a loss of power, the spindle motor is used as a generator as it continues to spin due to inertia. As areal densities increase and the size of the discs continue to decrease, the amount of power available from the inertia of the spinning discs after power down will continue to decrease, making expeditious parking of the heads using a minimal amount of power an even more important consideration in the future. The general use of the spindle motor back EMF to provide power used during a disc drive shut down sequence is discussed in U.S. Pat. No. 4,679,102 entitled METHOD AND MEANS FOR PARKING READ/WRITE HEADS IN A DISC DRIVE USING THE BACK-EMF OF THE SPINDLE MOTOR TO OPERATE A STEPPER MOTOR, issued to Wevers, Krause and Battu, assigned to the assignee of the present invention and incorporated herein by reference.

Thus, although the prior art latches referenced above have been operable, there is a need for an improved actuator latch capable of receiving and latching the actuator quickly using a minimal amount of power, while at the same time providing sufficient latching force to withstand large non-operating, mechanical shocks encountered by the disc drive. Additionally, there is a need for an improved actuator latch comprising components which are easily fabricated and installed, without requiring significant adjustments during high volume disc drive manufacturing.

SUMMARY OF THE INVENTION

The present invention comprises an improved latch assembly for latching an actuator in a disc drive. Accordingly, the latch assembly comprises a coil assembly that selectively generates magnetic fields of alternating polarity in a pair of magnetically permeable plates. The plates are separated by a vertical gap which includes a coil, so that the passage of electrical current through the coil establishes magnetic polarities within the plates.

Adjacent the coil assembly is a rocker assembly which is pivotable about a horizontal axis and comprises a latch arm and a coil arm, both of which extend in opposite directions from a central hinge portion. The distal end of the coil arm includes a permanent magnet which alternately detents between positions proximate to the plates of the coil assembly.

The latch assembly latches the actuator by energizing the coil, which establishes a magnetic field in the plates that interacts with the magnetic field of the permanent magnet to move the coil arm proximate one of the plates, causing the rocker assembly to pivot so that the distal end of the latch arm latches the actuator. To unlatch the actuator, a current is applied to the coil to establish a magnetic field of opposite polarity, so that the coil arm moves to a position proximate the other one of the plates, causing the rocker assembly to pivot so that the latch arm moves out of the way of the actuator, allowing free movement of the actuator.

The gap between the coil arm and the coil assembly when the actuator is latched is less than the gap between the coil arm and the coil assembly when the actuator is unlatched. Additionally, the attraction between the permanent magnet and the plates is sufficient without application of the magnetic fields to maintain the orientation of the rocker assembly.

An object of the present invention is to provide improved latching of a disc drive actuator to secure the heads during non-operation of the drive.

Another object of the present invention is to securely latch the actuator using a minimal amount of power during the parking operation without thereafter requiring the use of power to maintain the actuator in the latched position.

Still another object of the present invention is to provide an inexpensive and easily manufacturable actuator latch assembly.

Other objects, advantages and features of the present invention will be apparent from the following description when read in conjunction with the drawings and appended claims.

DETAILED DESCRIPTION OF THE PREFERRED EMBODIMENT

Figure 1:
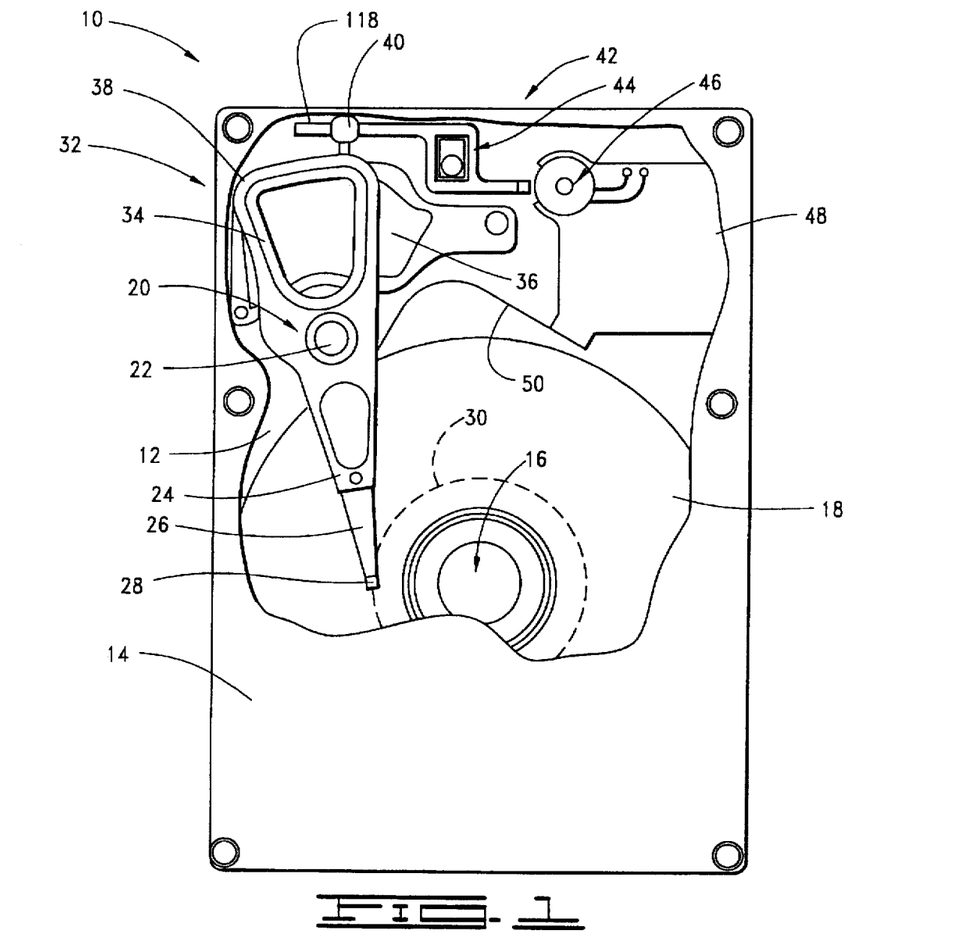
FIG. 1 is a plan view of a disc drive in which the present invention is particularly useful.

Turning now to the drawings and more particularly to FIG. 1, shown therein is a plan view of a disc drive 10 in which the present invention is particularly useful. The disc drive 10 includes a base housing 12 to which various disc drive components are mounted and a top cover 14, which provides a sealed internal environment for the disc drive 10. The top cover 14 is shown in a partial cut-away fashion to expose selected components of interest.

Mounted to base housing 12 is a spindle motor (shown generally at 16) to which a plurality of discs 18 are mounted for rotation at a constant high speed. Adjacent the discs 18 is an actuator assembly 20 which pivots about a pivot shaft 22 in a rotary fashion. The actuator assembly 20 includes actuator arms 24 which support gimbal assemblies 26, which in turn support heads 28, with each of the heads 28 corresponding to a surface of one of the discs 18. As provided hereinabove, the heads 28 are positionably located over data tracks (not shown) of the discs 18 in order to read data from and write data to the tracks, respectively. At such time that the disc drive 10 is not in use, the heads 28 are moved to landing zones (denoted at broken line 30), which are located in FIG. 1 near the inner diameter of the discs 18.

The actuator assembly 20 is controllably positioned by way of a voice coil motor (VCM, shown generally at 32), comprising an actuator coil 34 immersed in the magnetic field generated by a permanent magnet 36. It will be recognized that a magnetically permeable flux path (such as a steel plate) is mounted above the actuator coil 34 to complete the magnetic circuit to the VCM 32, but for purposes of illustration this flux path has not been shown in FIG. 1. When controlled DC current is passed through the actuator coil 34, an electromagnetic field is set up which interacts with the magnetic circuit of the VCM 32 to cause the actuator coil 34 to move relative to the permanent magnet 36 in accordance with the well-known Lorentz relationship. As the actuator coil 34 moves, the actuator assembly 20 pivots about the shaft 22, causing the heads 28 to move across the surfaces of the discs 18.

The actuator assembly 20 is further shown to include a coil retaining bracket 38 to which the actuator coil 34 is secured. The coil retaining bracket 38 includes a bumper assembly 40, comprising an extension arm (not separately designated in FIG. 1) surrounded by a compliant material, such as vulcanized rubber. Adjacent to the bumper assembly 40 is a latch assembly (generally denoted at 42), which cooperates with the bumper assembly 40 to latch the actuator assembly 20 at such time that the heads 28 are to be parked over the landing zones 30. The construction and operation of the latch assembly 42 will be discussed more fully hereinbelow; however, the latch assembly 42 comprises a rocker assembly generally denoted at 44 and a coil assembly generally denoted at 46, with the coil assembly 46 being integral with a flex circuit bracket 48. As will be recognized, the flex circuit bracket 48 provides mechanical and electrical connections to a flex circuit 50, which serves to pass electrical signals to and from the heads 28 during reading and writing operations of the disc drive 10 in a conventional manner.

Figure 2:
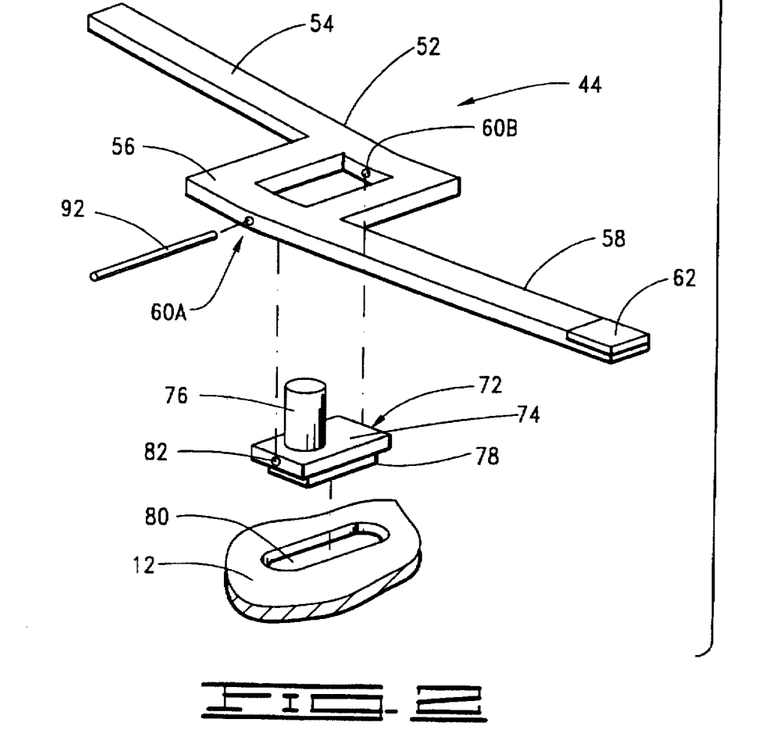
FIG. 2 is an exploded, isometric view of a rocker assembly of FIG. 1.

Turning now to FIG. 2, shown therein is an exploded, isometric view of the rocker assembly 44 of FIG. 1. More particularly, FIG. 2 shows the rocker assembly 44 to include a rocker 52, comprising a rigid latch arm 54 extending from a generally rectangular hinge section 56 (hereinafter also referred to as the "hinge 56"). Additionally, the rocker 52 comprises a rigid coil arm 58 that also extends from the hinge 56, with the latch arm 54 and the coil arm 58 extending from opposite sides of the hinge 56, as shown. The hinge 56 is preferably angled slightly so that the latch arm 54 extends upwardly with respect to the coil arm 58 at a preselected angle, which in the preferred embodiment is from about 5 to 8 degrees. It will be recognized that other angles may be selected as desired, depending upon the configuration of the cooperating elements of the latch assembly 42, the lengths of the latch arm 54 and the coil arm 58, and internal space requirements of the disc drive 10, as will be discussed below.

The hinge 56 is shown to include a pair of holes 60A, 60B extending through the sides of the hinge 56. The holes 60A, 60B are axially aligned so that, upon assembly of the latch assembly 42, the rocker 52 "toggles" up and down about the axis defined by the holes 60A, 60B. Additionally, the distal end of the coil arm 58 is shown to include a permanent magnet 62.

Continuing with FIG. 2, also shown therein is a yoke 72, comprising a rectangularly shaped body 74 dimensioned so as to fit within the inner dimensions of the hinge 56 of the rocker 52. Attached to the body 74 is a vertical, circular pin 76, which serves as a rigid, outer diameter crash stop for the bumper assembly 40 of FIG. 1, as described more fully hereinbelow. The yoke 72 further includes a rectangular insertion block 78 (hereinafter also referred to as the "plug 78"), which is pressed into an oval recess 80 of the base housing 12 during assembly. More particularly, the plug 78 and the oval recess 80 are sized accordingly to allow the four corners of the plug 78 to contact the walls of the oval recess 80 at four corresponding points, so as to allow the yoke 72 to be press fit into the base housing 12. The body 74 preferably has larger length and width dimensions than the plug 78, so that the underside of the body 74 rests upon and is flush with the top side of the base housing 12 when the yoke 72 is fully mated with the base housing 12. The yoke 72 is preferably fabricated from a suitable plastic material.

A hole 82 also extends through the body 74 of the yoke 72. Thus, during assembly of the latch assembly 42, a pivot pin 92 is inserted through one of the holes 60A, 60B in the hinge 56, through the hole 82 in the body 74 and then through the other one of the holes 60A, 60B. Preferably, the pivot pin 92 and the holes 60A, 60B are sized accordingly to allow a press fit among these elements, whereas the hole 82 is slightly larger in diameter than the pivot pin 92, allowing relative rotation between the rocker 52 and the yoke 72 about the pivot pin 92, as illustrated in FIG. 3.

Figure 3:
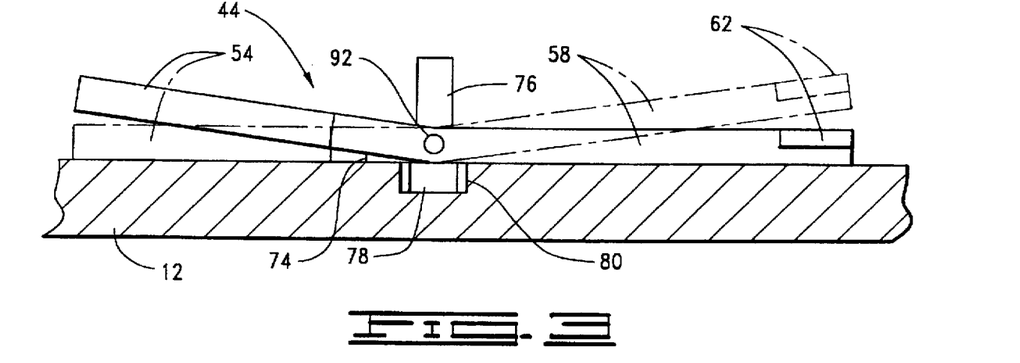
FIG. 3 is an assembled, elevational view of the rocker assembly of FIG. 2.

Referring to FIG. 3, shown therein is an elevational view of the assembled rocker assembly 44 of FIG. 2, installed into the base housing 12 (which is shown in cross-section to illustrate the relationship between the plug 78 and the oval recess 80). As shown in FIG. 3, the coil arm 58 is in a "down" position so as to rest upon the base housing 12 and the latch arm 54 is shown extended in an "upward" position. As discussed hereinbelow, such orientation of the rocker assembly 44 will hereinafter be referred to as a "latched" position. Additionally, FIG. 3 shown dotted lines for the latch arm 54 and the coil arm 58 wherein the latch arm 54 is flush with the base housing 12 and the coil arm 58 is extended upwardly, corresponding to an "unlatched" position for the rocker assembly 44. Thus, as will be discussed hereinbelow, the rocker 52 will detent between these latched and unlatched positions by toggling about the pivot pin 92.

Figure 4:
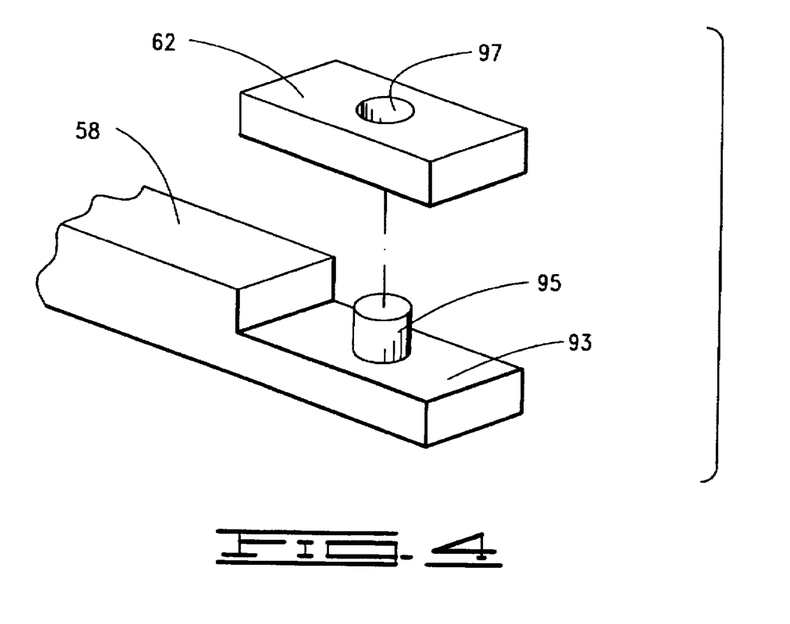
FIG. 4 is an exploded, isometric view of a portion of the rocker assembly of FIG. 2, showing the location of a permanent magnet at a distal end of the rocker assembly.

Referring now to FIG. 4, shown therein is an isometric, exploded view of a distal end portion of the coil arm 58 of FIG. 3, illustrating a preferred method for attaching the permanent magnet 62 to the coil arm 58. More particularly, the distal end of the coil arm 58 is configured to include a shelf 93, so that the height of the coil arm 58 at the shelf 93 is less than the height of the coil arm 58 for the remaining extent of the arm. Additionally, the shelf 93 includes a post portion 95 which mates with a corresponding hole 97 in the permanent magnet 62. Thus the permanent magnet 62 is preferably attached to the coil arm 58 by hot swaging the permanent magnet onto the coil arm 58 by way of the post portion 95 and the hole 97. Once the permanent magnet 62 is installed, the top surface of the permanent magnet 62 is nominally flush with the top surface of the coil arm 58, as shown in FIG. 3.

Figure 5:
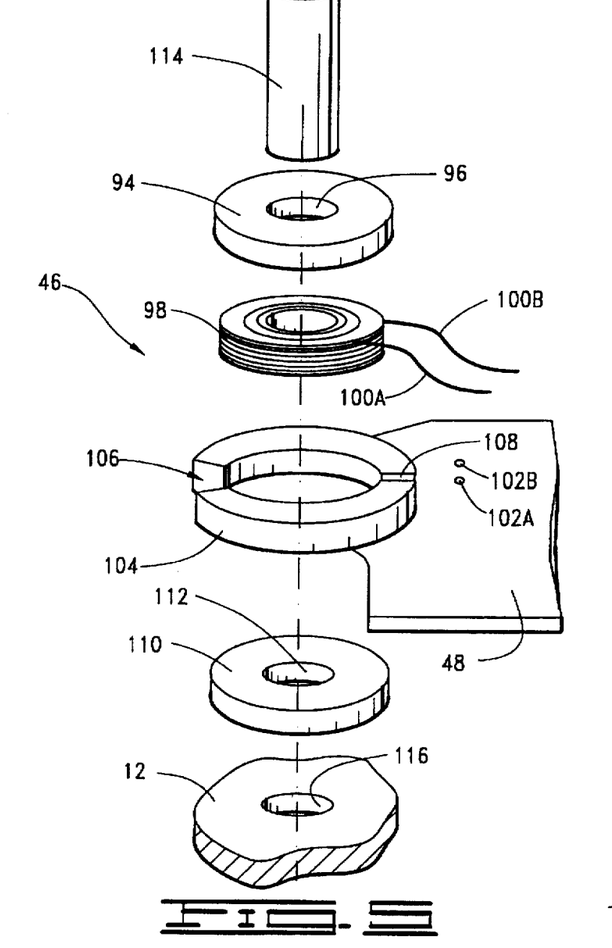
FIG. 5 is an exploded, isometric view of a coil assembly of FIG. 1.

Having concluded a discussion of the construction of the rocker assembly 44, the coil assembly 46 of FIG. 1 will now be discussed. Referring to FIG. 5, shown therein is an exploded, isometric view of the coil assembly 46, which operates in conjunction with the rocker assembly 44 of FIG. 3 to latch the actuator assembly 20 of FIG. 1. FIG. 5 shows the coil assembly 46 to comprise a top plate 94, which comprises a circular magnetically permeable material, such as steel. The top plate 94 has a hole 96 of a selected diameter extending through the center of the top plate 94.

The coil assembly 46 further comprises a coil 98, which is pre-wound using suitable insulated wire. Two leads 100A, 100B extend from the coil 98, with the terminal ends of the leads 100A, 100B exposed to facilitate electrical attachment to corresponding pads 102A, 102B on the flex circuit bracket 48.

The flex circuit bracket 48 provides the electrical and mechanical connection for the flex circuit 50 in a conventional manner; hence, these features have not been particularly shown in the drawings. However, the flex circuit bracket 48 also includes a coil bracket 104 for securing the coil 98. Particularly, the coil bracket 104 comprises a semi-circular bracket having an internal diameter sized so as to receive and secure the coil 98 and the height of the coil bracket 104 is preferably the same as the height of the coil 98. As shown in FIG. 5, the coil bracket 104 also includes a gap 106, so that the coil bracket 104 does not completely wrap around the coil 98. The coil bracket 104 further has a notch 108 sized to accommodate the leads 100A, 100B from the coil 98, so that the leads 100A, 100B can be routed by way of the notch 108 to the pads 102A, 102B on the surface of the flex circuit bracket 48 for attachment thereto.

The coil assembly 46 further includes a bottom plate 110, which, like the top plate 94, comprises a circular magnetically permeable material, such as steel. The bottom plate 110 also has a hole 112 of a selected diameter extending through the center of the bottom plate 110.

Figure 6:
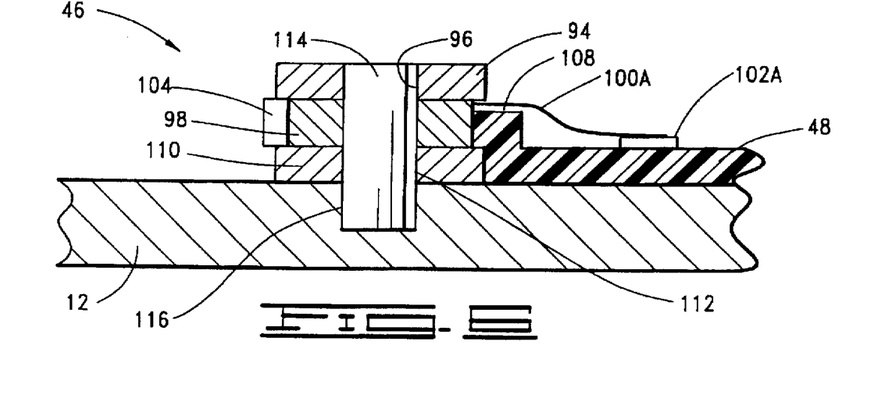
FIG. 6 is an elevational, partial cross-sectional view of the coil assembly of FIG. 5.

Finally, the coil assembly 46 of FIG. 5 includes a shaft 114, which is made from permeable steel and pressed through the holes 96 and 112 of the top and bottom plates 94 and 110, respectively, sandwiching the coil bracket 104 and the coil 98 between the top and bottom plates 94 and 110. The length of the shaft 114 is selected so that, upon installation, the top of the shaft 114 is nominally flush with the top surface of the top plate 94, and the bottom of the shaft 114 extends beyond the bottom surface of the bottom plate 110, so that the shaft 114 can be pressed into a corresponding hole 116 in the base housing 12 provided for this purpose. More particularly, the coil assembly 46 of FIG. 5 is shown assembled in FIG. 6, which provides a partial cross-sectional view of the coil assembly 46 installed into the base plate 12. As shown in FIG. 6, the bottom surfaces of the bottom plate 110 and the flex circuit bracket 48 are nominally flush with the top surface of the base housing 12.

Figure 7:
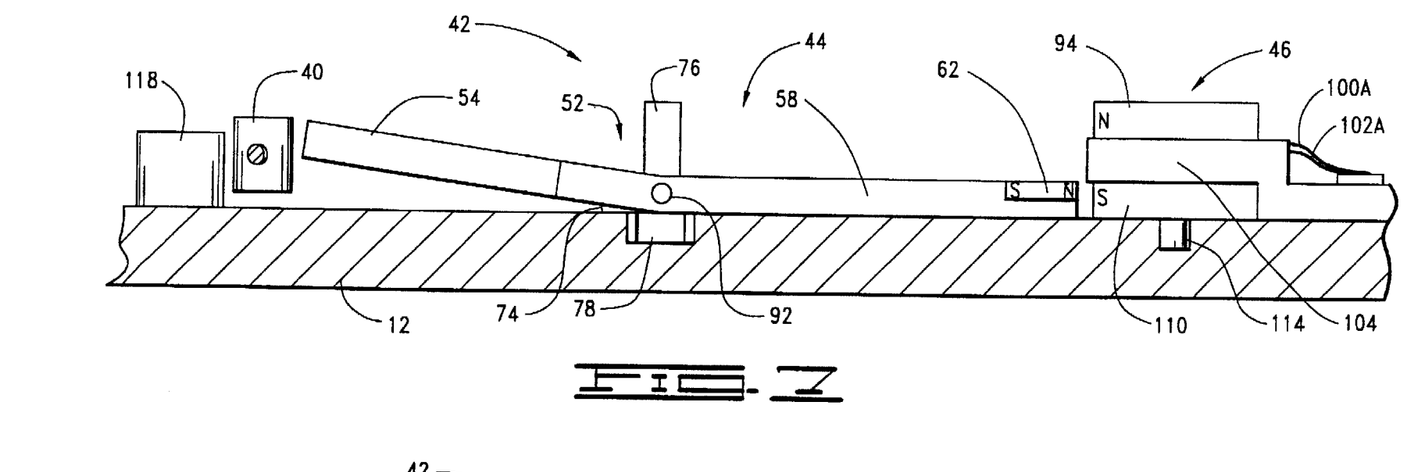
FIG. 7 illustrates the latch assembly of FIG. 1 in a latched position.

Having concluded a discussion of the construction of the coil assembly 46, the operation of the latch assembly 42 will now be discussed. Beginning with FIG. 7, shown therein is the latch assembly 42 in conjunction with the bumper assembly 40 of the actuator assembly 20 (FIG. 1). As shown in FIG. 7, the latch assembly 42 is in the latched position, as the latch arm 54 is extended upwardly, capturing the bumper assembly 40 between the distal end of the latch arm 54 and a retention tab 118. The retention tab 118 is preferably a rectangular, sheet metal tab extending upwardly from the base housing 12 and located so as to serve as an inner diameter crash stop for the bumper assembly 40 as well as to capture the bumper assembly 40 between the retention tab 118 and the latch arm 54 when the heads 28 are parked. A plan view of this configuration is shown on FIG. 1.

Additionally, the permanent magnet 62 located at the distal end of the coil arm 58 is in close proximity to the bottom plate 110 of the coil assembly 46. The magnetic polarity of the permanent magnet 62 is oriented as shown, so that the north pole of the permanent magnet is located towards the coil assembly 46. Thus oriented, the permanent magnet 62 will nominally exert an attractive force upon the bottom plate 110, with the strength of the force dependent upon the distance between the permanent magnet 62 and the bottom plate 110. It is contemplated that the strength of the permanent magnet 62, the magnetic permeability of the bottom plate 110 and the relative distance between the permanent magnet 62 and the bottom plate 110 will be selected so that, once the latch assembly 42 is oriented as shown in FIG. 7, the bumper assembly 40 will be sufficiently retained by the latch arm 54 and the retention tab 118.

It will be recognized that, through the application of electrical current of a selected polarity and magnitude to the coil 98 of the coil assembly 46, the coil 98 will generate a magnetic field, with the top and bottom plates 94, 110 serving as flux paths so that the top and bottom plates 94, 110 will take on opposite magnetic polarities. Particularly, it is contemplated that at such time that the actuator assembly 20 is to be latched, the coil assembly 46 will be energized so that the bottom plate will become a south pole, which will interact with the north pole of the permanent magnet 62, attracting the distal end of the coil arm 58 towards the bottom plate 110 of the coil assembly 46, as shown in FIG. 7. Once the coil arm 58 is so aligned, the magnetic field of the coil assembly 46 can be removed, as the attraction between the permanent magnet 62 and the bottom plate 110 will be sufficient to retain the latch assembly 42 in this position.

Figure 8:
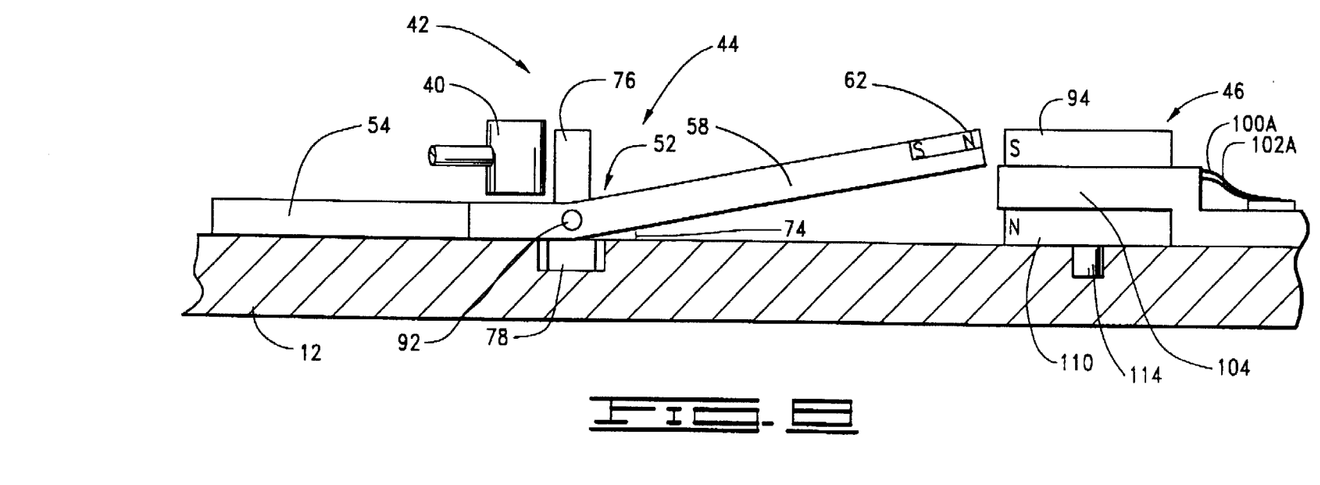
FIG. 8 illustrates the latch assembly of FIG. 1 in an unlatched position.

Referring to FIG. 8, shown therein is the latch assembly 42 of FIG. 7, but this time configured in the unlatched position with the coil arm 58 flush with the base housing 12 and the coil arm 58 extended upwardly towards the top plate 94 of the coil assembly 46, so that the permanent magnet 62 is proximate to the top plate 94 as shown. Thus, as with the permanent magnet 62 and the bottom plate 110 in FIG. 7, there will likewise be an attractive force between the permanent magnet 62 and the top plate 94 and the strength of this force will be dependent upon the distance therebetween. As shown in FIG. 8, the gap between the permanent magnet 62 and the top plate 94 is greater than the gap between permanent magnet 62 and the bottom plate 110 in FIG. 7. Thus, although the permanent magnet 62 will detent between these two positions, the force between the permanent magnet 62 and the top plate 94 (FIG. 8) will be less than the force between the permanent magnet 62 and the bottom plate 110 (FIG. 7). However, it is contemplated that the relative distance between the permanent magnet 62, as well as the strength of the permanent magnet 62 and the magnetic permeability of the top plate 94 will be selected so that there will be sufficient force to retain the latch assembly 42 in the position shown in FIG. 8 so that the latch assembly 42 remains in the unlatched position during normal operation of the disc drive 10.

Particularly, during normal operation of the disc drive 10, as described above the actuator assembly 20 will be positioned as required so as to move the heads 28 over selected data tracks for reading and writing of data to the discs 18. During such operation, the latch arm 54 is flush with the base housing 12, allowing the bumper assembly 40 to move over the latch arm 54 without interference. As shown in FIG. 8, as the heads 28 are moved to the outer extremes of the discs 18, the bumper assembly 40 will encounter the outer diameter crash stop provided by the circular pin 76 of the latch assembly 42, limiting further travel in this direction.

It will now be recognized that the latch assembly 42 is moved between the latched and unlatched positions by the selective energizing of the coil 98 of the coil assembly 46, so that one of the top and bottom plates (94 and 110) proximate to the permanent magnet 62 is provided with a magnetic pole of the same polarity as the permanent magnet 62 and the other one of the top and bottom plates (94 or 110) is provided with a magnetic pole of opposite polarity as the permanent magnet 62. Thereafter, the attractive force between the permanent magnet 62 and the other one of the top and bottom plates (94 or 110) will be sufficient to hold the latch assembly 42 in place without further need to energize the coil 98 of the coil assembly 46. Thus, the coil 98 need only be energized for short periods of time upon initialization of the latching and unlatching operations.

By way of illustration, the sequence of events comprising the latching of the actuator assembly 20 will now be discussed. Particularly, as set forth above during normal operation of the disc drive 10, the latch assembly 42 is oriented in the unlatched position as shown in FIG. 8. At such time that the heads 28 are to be parked, current is provided to the actuator coil 34 so that the actuator assembly 20 pivots about the pivot shaft 22 (FIG. 1) until the heads are positioned over the landing zones 30 and the bumper assembly 40 is adjacent the retention tab 118. A latch current is thereafter applied to the coil 98 so that the permanent magnet 62 is repulsed by the top plate 94 and attracted to the bottom plate 110, causing the rocker 52 to pivot about the pivot pin 92 until the coil arm 58 is flush with the base housing 12, as shown in FIG. 7. As provided hereinabove, the latch current is only required for a short period of time and is removed once the permanent magnet 62 is sufficiently positioned adjacent the bottom plate 110.

At such time that the actuator assembly 20 is to be unlatched, once the discs 18 are spinning at a velocity sufficient to support the heads 28 over the discs 18, an unlatch current is applied to the coil 98 so that the permanent magnet 62 is repulsed by the bottom plate 110 and attracted to the top plate 94. This causes the rocker 52 to pivot about the pivot pin 92 until the coil arm 58 is again extended upwardly, bringing the permanent magnet 62 in proximity to the top plate 94, as shown in FIG. 8. Because the gap between the permanent magnet 62 and the top plate 94 is greater than the gap between the permanent magnet 62 and the bottom plate 110, the current required to unlatch the actuator assembly 20 will be greater than the current required to latch the actuator assembly 20. As provided hereinabove, however, this is advantageous as generally, only a limited amount of power is available during a latching operation, whereas a greater amount of power is available during an unlatching operation. Thus, the latch assembly 42 can be constructed so that a relatively small amount of the available power during power down is allocated for the latching of the actuator assembly 20.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A latch assembly for a disc drive having a base plate substantially extending in a first plane, the base plate supporting a rotating disc and a rotary actuator for controllably positioning a head adjacent data tracks on the disc, the actuator rotating about a first axis normal to the first plane of the base plate, the latch assembly comprising:

magnetic field generation means for generating magnetic fields of alternating polarity, comprising a first magnetically permeable plate and a second magnetically permeable plate separated by a first gap, the first magnetically permeable plate disposed adjacent to the base plate and having a top surface opposite the base plate, the top surface substantially parallel with the first plane of the base plate, the second magnetically permeable plate disposed over the top surface of the first magnetically permeable plate with respect to the first plane of the base plate and substantially parallel with the first plane of the base plate, wherein the first gap extends in a direction normal to the first plane of the base plate and parallel to the first axis of the actuator so that the first magnetically permeable plate is disposed between the second magnetically permeable plate and the first plane of the base plate, wherein magnetic polarities of the first and second magnetically permeable plates are selectively established in response to currents directed through the magnetic field generation means; and actuator latching means, adjacent the magnetic field generation means and pivotable about a second axis parallel to the first plane of the base plate, for selectively latching the actuator when the actuator latching means is pivoted to a position proximate the first magnetically permeable plate by the magnetic polarity of the first magnetically permeable plate, the actuator latching means comprising:

support structure rigidly affixed adjacent the base plate, the support structure disposed between the actuator and the magnetic field generation means;

a central hinge portion disposed adjacent the support structure;

pivot means, connected to the support structure and the central hinge portion, for allowing pivotal movement of the central hinge portion relative to the support structure about the second axis;

a latch arm, connected to the central hinge portion, the latch arm extending along a line in a direction towards the actuator;

a coil arm, connected to the central hinge portion, the coil arm extending along a line in a direction towards the magnetic field generation means, the coil arm including a permanent magnet which interacts with the magnetic polarities of the first and second magnetically permeable plates to move the coil arm to detent positions proximate the first and second magnetically permeable plates;

wherein the actuator is latched by the latch arm when the permanent magnet is positioned proximate to the first magnetically permeable plate and the actuator is unlatched by the latch arm when the permanent magnet is positioned proximate to the second magnetically permeable plate; wherein attractive magnetic forces between the permanent magnet and the first and second magnetically permeable plates are sufficient to maintain the orientation of the actuator latching means in the corresponding detent positions without the passage of current through the magnetic field generation means; wherein a second gap between the permanent magnet and the second magnetically permeable plate when the permanent magnet is positioned proximate to the second magnetically permeable plate is greater than a third gap between the permanent magnet and the first magnetically permeable plate when the permanent magnet is positioned proximate to the first magnetically permeable plate; wherein the coil arm and the latch arm are angled with respect to the central hinge portion so that the line along which the latch arm extends is substantially parallel to the first plane of the base plate at such time that the actuator is unlatched and skewed with respect to the first plane of the base plate at such time that the actuator is latched; and wherein at least a portion of the actuator passes over at least a portion of the latch arm so that the latch arm is disposed between the actuator and the first plane of the base plate when the actuator is unlatched and the head is moved to a position adjacent the data tracks of the disc.

2. The latch assembly of claim 1, wherein the actuator latching means further comprises a crash stop connected to and disposed over the support structure, the crash stop limiting maximum radial movement of the actuator in a direction away from the position at which the actuator is latched by the latch arm.

3. The latch assembly of claim 1, wherein the magnetic field generation means further includes a coil located within the first gap between the first and second magnetically permeable plates, wherein the currents are applied to the coil to selectively establish the magnetic polarities of the first and second magnetically permeable plates.

4. In a disc drive having a disc and an actuator adjacent the disc, the actuator controllably positionable over a surface of the disc, the actuator rotating about a first axis, a latch assembly for latching the actuator comprising:

a latch supported in the disc drive so as to pivot about a second axis substantially normal to a plane containing the first axis, the latch having a latched position and an unlatched position, the latch including;

a support structure having an axis opening through the support structure, the axis opening aligned along the second axis;

a central hinge portion adjacent the support structure, the central hinge portion including a central opening through which a portion of the support structure extends, the central hinge portion further including a pair of pivot openings, the pivot openings aligned with the second axis and substantially normal to the central opening;

a pivot pin, disposed along the second axis and through the pair of pivot openings in the central hinge portion and the axis opening in the support structure, the pivot pin allowing the central hinge portion to rotate relative to the support structure;

a latch arm extending from a first end of the central hinge portion towards the actuator;

a coil arm extending from a second end of the central hinge portion in a direction away from the actuator, the second end opposite the first end;

a permanent magnet connected to the coil arm;

a coil assembly supported in the disc drive, the coil assembly disposed adjacent the coil arm of the latch, the coil assembly comprising:

a first magnetically permeable member supported by the disc drive;

a coil supported over the first magnetically permeable member;

a second magnetically permeable member supported over the coil and the first magnetically permeable member;

wherein the first and second magnetically permeable members generate a first magnetic field at such times that current is applied to the coil in a first direction, wherein the first and second magnetically permeable members generate a second magnetic field at such times that current is applied to the coil in a second, opposite direction, wherein the first magnetic field causes the latch to pivot about the second axis to the latched position through magnetic attraction between the permanent magnet of the coil arm and the first magnetically permeable member and the second magnetic field causes the latch to pivot about the second axis to the unlatched position through magnetic attraction between the permanent magnet of the coil arm and the second magnetically permeable member, wherein the latch arm is aligned in a direction substantially normal to the first axis at such times that the latch is in the unlatched position and aligned in a skewed direction with respect to the first axis at such times that the latch is in the latched position, and wherein the actuator passes over the latch arm over at least a portion of a range of rotation of the actuator when the actuator is in the unlatched position and moved over the surface of the disc.

5. The latch assembly of claim 4, wherein the latch detents to positions proximate the first and second magnetically permeable members.

6. The latch assembly of claim 5, wherein the first magnetically permeable member is separated by a first field gap from the latch when the latch is in the unlatched position, wherein the second magnetically permeable member is separated by a second field gap from the latch when the latch is in the latched position, and wherein the second field gap is greater than the first field gap.

7. The latch assembly of claim 6, wherein the latch remains in position when no magnetic field is generated in the first and second magnetically permeable members.

8. The latch assembly of claim 4, further comprising a crash stop disposed over the second axis and extending from the support structure along a third axis parallel to the first axis, the crash stop limiting the extent of travel of the actuator in a direction away from the latched position.

* * * * *

UNITED STATES PATENT AND TRADEMARK OFFICE
CERTIFICATE OF CORRECTION

PATENT NO. : 5,694,271
DATED : December 2, 1997
INVENTOR(S) : F. Mark Stefansky

It is certified that error appears in the above-indentified patent and that said Letters Patent is hereby corrected as shown below:

Column 9, line 20, insert --a-- before the words 'support structure'.

Signed and Sealed this

Eighth Day of September, 1998

Attest:

BRUCE LEHMAN

Attesting Officer

Commissioner of Patents and Trademarks